(12) United States Patent
Shirayanagi (10) Patent No.: US 6,393,933 B2
(45) Date of Patent: May 28, 2002

(54) THROTTLE LEVER DEVICE (75) Inventor: Naotoshi Shirayanagi, Shizuoka (JP)

(73) Assignee: Asahi Denso Co., Ltd., Shizuoka (JP)

( * ) Notice: Subject to any disclaimer, the term of this patent is extended or adjusted under 35 U.S.C. 154(b) by 0 days.

(21) Appl. No.: 09/405,225

(22) Filed: Sep. 27, 1999

(30) Foreign Application Priority Data

Oct. 5, 1998 (JP) .......................................... 10-282161

(51) Int. Cl.$^7$ .......................... F02D 11/02; B62K 23/06
(52) U.S. Cl. ........................................ 74/489; 74/502.2
(58) Field of Search .......................... 74/523, 524, 525, 74/500.5, 501.6, 502, 502.2, 489

(56) References Cited

U.S. PATENT DOCUMENTS

| 1,938,897 A | * 12/1933 | Frazier ...................... 74/501.6 |
| 3,881,461 A | 5/1975 | Filip |
| 4,088,040 A | * 5/1978 | Ross-Myring ............... 74/489 |
| 4,213,513 A | 7/1980 | Beck |
| 4,237,997 A | 12/1980 | Swanson |
| 4,726,252 A | * 2/1988 | Dawson ....................... 74/523 |
| 4,899,610 A | * 2/1990 | Bourret ...................... 74/502.2 |
| 6,047,611 A | * 4/2000 | Warren et al. ............. 74/502.2 |

FOREIGN PATENT DOCUMENTS

| FR | 406488 | * 1/1910 | |
| FR | 2598135 | * 11/1987 | ................ 74/502.2 |
| FR | 2620407 | * 3/1989 | ................ 74/502.2 |
| JP | 7-19086 | 4/1995 | |
| JP | 7-77877 | 8/1995 | |
| JP | 10-129293 | 5/1998 | |

* cited by examiner

Primary Examiner—William C. Joyce
(74) Attorney, Agent, or Firm—Sughrue Mion, PLLC (57) ABSTRACT

A throttle lever device mounted in the vicinity of a grip at one end of a handlebar of a water jet bike or a snowmobile. The throttle lever device has an operation lever 3 with a front end portion that is movable vertically relative to a bracket 1. The operation lever 3 actuates a throttle cable 6 by virtue of gripping operations.

9 Claims, 10 Drawing Sheets

THROTTLE LEVER DEVICE

BACKGROUND OF THE INVENTION

1. Field of the Invention

The present invention relates to a throttle lever device or increasing and/or decreasing the output of an engine via throttle cable attached to a handlebar of a water jet bike or a snowmobile in the vicinity of a grip thereof.

2. Description of the Prior Art

Figure 13:
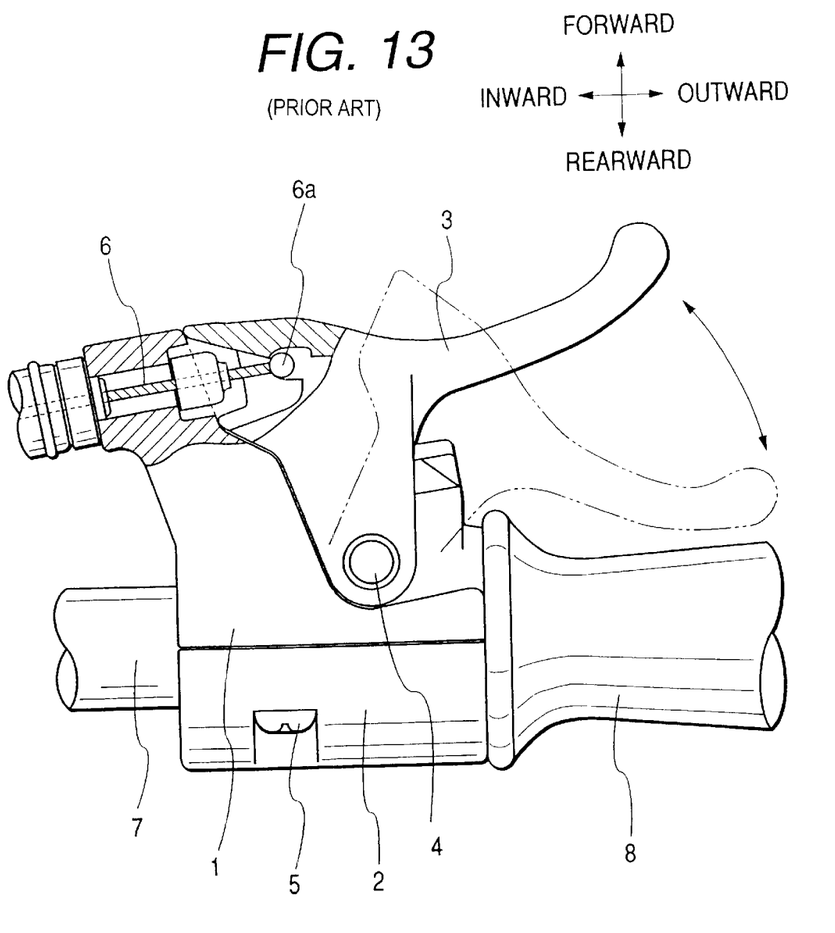
FIG. 13 is a partially cutaway plan view of a conventional throttle lever device.

As shown in FIG. 13, in a conventional throttle lever of this type, a throttle cable 6 is provided for connecting an operation lever 3 and a throttle valve (not shown) of a carburetor. This throttle lever device is fixedly attached to a right-hand side of a handlebar 7 in the vicinity of a grip 8 attached to an end of the handlebar, when viewed from an operator in a travelling direction, via a synthetic resin bracket 1 and a holder 2, which are attached to the handlebar 7 in such a manner as to hold it therebetween and are fixedly clamped together with an attachment bolt 5. A support shaft 4 is put through the bracket 1 vertically, so that the operation lever 3 is rotatably supported thereon at a rear end portion thereof. The throttle cable 6 is connected to a front end portion of the operation lever 3 at a drum-like member 6a affixed to a tip thereof. In this construction, the operation lever 3 is rotated about the support shaft 4 when it is grasped with the fingers, whereby the throttle cable 6 is in turn pulled to thereby open the throttle valve.

The aforesaid water jet bike or snowmobile is turned to the left or right when the handlebar 7 is so turned. When turning the handlebar in such a way, as shown in FIG. 14, the position of the fingers of the rider changes vertically relative to the operation lever 3 due to the fact that the handlebar 7 is turned at a certain angle relative to the vehicle body and that the arm of the rider is flexed and/or extended during such operations.

Figure 14:
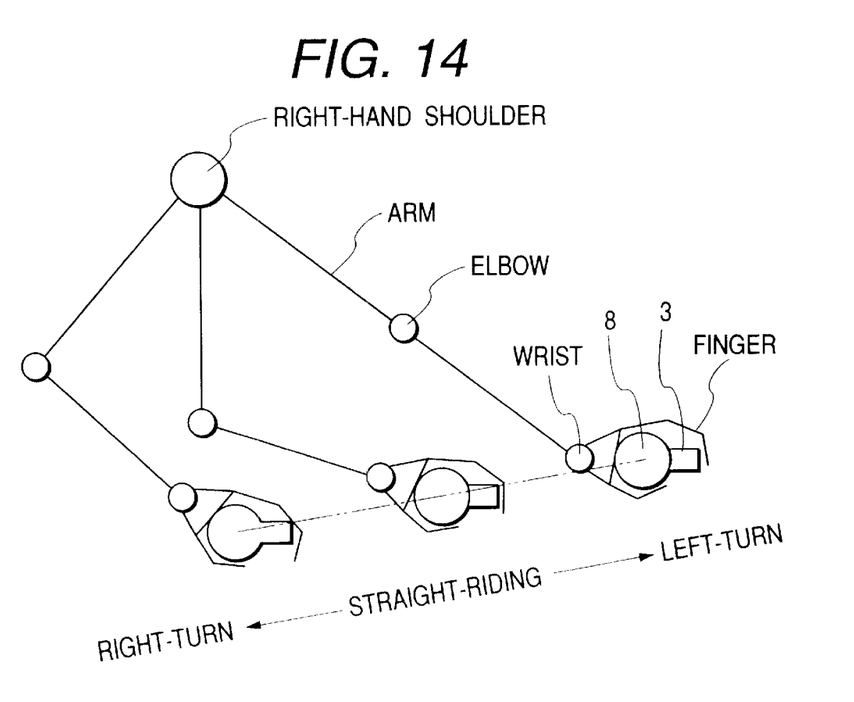
FIG. 14 is a diagram showing a relationship between an operation lever of the conventional throttle lever device and the movements of the fingers and arm of a rider.

In other words, when turning to the left, as shown on the rightmost side of FIG. 14, since the arm is extended, the wrist being flexed slightly upwardly, the tips of the fingers tend to move upwardly when compared with the position of the fingers assumed when riding straight as shown at the center of the drawing. On the contrary, when turning to the right, as shown on the leftmost side of the drawing, since the arm is flexed, the wrist being extended slightly downwardly, the tips of the fingers tend to move downwardly when compared with the position thereof assumed when riding straight as shown at the center of the drawing. When these happen, with the conventional throttle lever device, since it is allowed to rotate in horizontal directions but is not in vertical directions, the operation lever 3 cannot follow the movements of the fingers of the rider, leading to a drawback that the operability is deteriorated.

SUMMARY OF THE INVENTION

The present invention improves the operability of a water jet bike or a snowmobile by constructing an operation lever 3 of a throttle lever device such that it oscillates relative to a throttle lever bracket in vertical directions at a front end portion thereof, so that the operation lever 3 can follow the movements of the fingers of the rider when he or she operates and turns a handlebar 7.

In other words, a first aspect according to the present invention provides a throttle lever device wherein an operation lever 3 is allowed to move vertically relative to a throttle lever bracket 1 within a certain range at a front end portion thereof, and wherein a throttle cable 6 is operated directly or indirectly through gripping operations of the operation lever 3.

A second aspect according to the present invention provides a throttle lever device, wherein a bracket 1 for a throttle lever is provided adjacent to an inside of a grip 8 provided at an end of a handlebar 7, wherein a support shaft 4 is provided and extended in a vertical direction at a front portion of the bracket 1, so that an opening of a driving arm 11 is rotatably supported thereon, which driving arm has a substantially U-shaped cross-section and with a front end internal surface of which a drum-like member 6a of a throttle cable 6 is brought into engagement, wherein a shaft 11a is provided and extended in a horizontal direction at an inner rearward portion of the U-shaped driving arm 11, so that the operation lever 3 is rotatably supported on the shaft at a rear end portion thereof, and wherein the operation lever 3 is constructed such that it oscillates in vertical directions at a front end thereof.

A third aspect according to the present invention provides a throttle lever device as set forth in the second invention, wherein a moderating mechanism is provided between the operation arm 3 and an internal surface of the driving arm 11.

A fourth aspect according to the present invention provides a throttle lever device, wherein a bracket 1 for a throttle lever is provided adjacent to an inside of a grip 8 provided at an end of a handlebar 7, which bracket has a hollow support portion 1d having upper and lower curved surfaces 1b at a front portion thereof, which support portion has a transversely elongated rectangular hole-like opening 1c formed in a front portion thereof and a longitudinally elongated hole 1a formed in the upper and lower curved surfaces, wherein an operator 22 having a barrel-type external surface is disposed inside the support portion 1d, and a support shaft is fixed to an axial center of the operator 22 with ends of the shaft 4 being allowed to protrude outwardly from the upper and lower elongated holes 1a, wherein an arm portion 21c of a cable driving arm 21 is provided in such a manner as to protrude forwardly from the opening 1c with a drum-like member 6a of a throttle cable 6 being locked to a distal end of the cable driving arm 21, which cable driving arm 21 has formed at a rear end thereof a pipe-like base portion 21a adapted to rotate on an outer circumferential surface of the barrel-type operator 22 inside the support portion 1d, wherein an inwardly formed opening of the operation lever 3 having a U-shaped cross-section is rotatably supported at both end portions of the support shaft 4 in such a manner as to cover the cable driving arm 21, and wherein an arc-like projection 3c is provided at a front inner end portion of the operation lever 3 for abutment with a distal inner end portion of the cable driving arm 21.

The present disclosure relates to subject matter contained in Japanese Patent Application No. Hei. 10-282161, filed on Oct. 5, 1999, and which is expressly incorporated herein by reference in its entirety.

DETAILED DESCRIPTION OF PREFERRED EMBODIMENTS

First Embodiment

Figure 1:
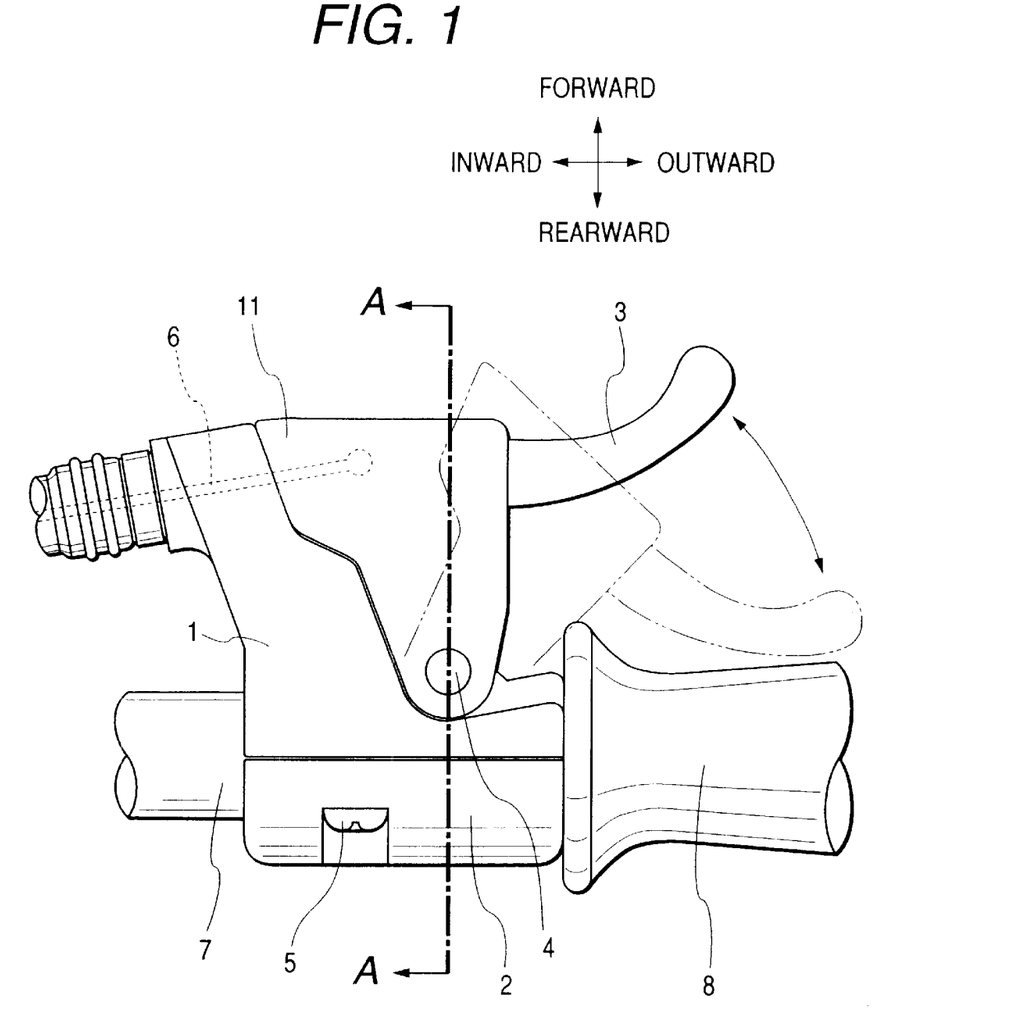
FIG. 1 is a plan view showing a first embodiment of the present invention.

In FIG. 1, reference numeral 1 denotes a bracket for a throttle lever provided adjacent to an inside of a grip 8 provided at an end of a handlebar 7 of a water jet bike or a snowmobile. This bracket 1 is made of a synthetic resin as with a conventional bracket and is combined with a holder 2 which is assembled to the handlebar 7 from the rear such that the bracket 1 and the holder 2 hold the handlebar 7 therebetween, and they are clamped together with an attachment bolt 5 for fixation together to the handlebar 7.

Figure 3:
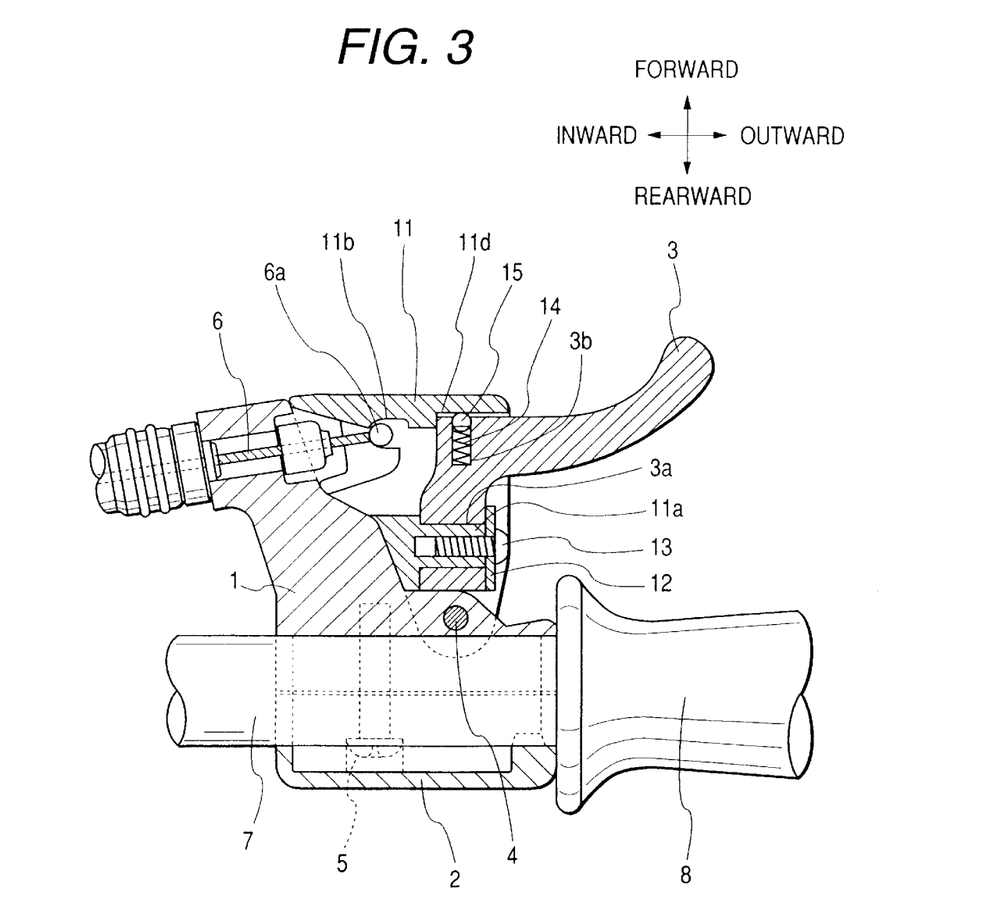
FIG. 3 is a sectional view taken along the line B—B of FIG. 2.
Figure 4:
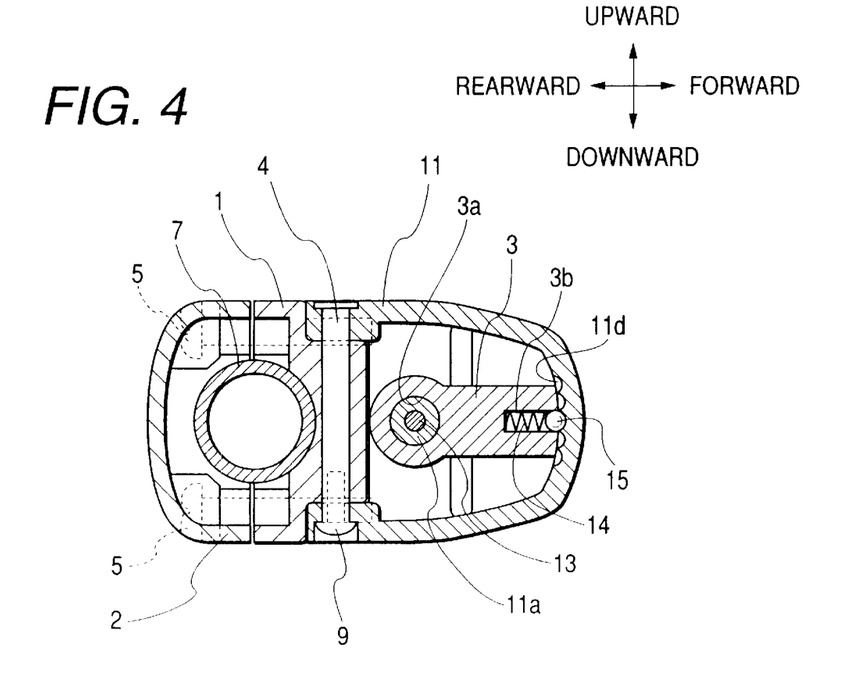
FIG. 4 is a sectional view taken along the line A—A of FIG. 1.

As shown in FIGS. 3 and 4, a support shaft 4 is provided at a front portion of the bracket 1 in a vertical direction, and openings of a driving arm 11, made from a synthetic resin and having a U-shaped cross-section, are rotatably supported on the support shaft 4, and a screw 9 is screwed into a lower end of the support shaft 4 from below so as to prevent the support shaft 4 from coming off the bracket 1.

Formed on a front inside portion of the driving arm 11, as shown in FIG. 3, is an engagement portion 11b for engagement with a drum member 6a disposed at a tip of a throttle cable 6, and a plurality of moderating grooves 11d (for instance, five grooves) are formed on the right-hand side of the engagement portion 11b at predetermined intervals, as shown in FIG. 4.

In addition, a shaft 11a is provided at an inwardly rear portion of the driving arm 11 in such a manner as to face outwardly, and the synthetic resin operation lever 3 is rotatably supported on the shaft 11a at a rear end portion thereof.

A spring hole 3b is formed in a front end of the operation lever 3, while a horizontal shaft hole 3a is formed in a rear portion thereof, and as shown in FIGS. 3 and 4, a moderating ball 15 is loaded in the spring hole 3b in such a state in which the ball is biassed outwardly. The ball 15 is then brought into elastic engagement with one of the moderating grooves 11d formed in the internal surface of the driving arm 11, and in this state, the shaft 11a is inserted into the shaft hole 3a, and when a screw 13 is screwed thereinto and tightened via a collar 12, the operation lever 3 is rotatably supported on the shaft 11a.

Reference numeral 6 denotes a throttle cable, which is identical with a conventional throttle cable. The throttle cable 6 is inserted from a left-hand side of the bracket, and the drum member 6a at the tip of the cable 6 is in engagement with the engagement portion 11b on the inside at the front end portion of the driving arm 11.

Next, an operation of the throttle lever device according to the first embodiment of the present invention will be described.

With the fingers being placed on the operation lever 3 while the grip 8 being grasped by the hand of the rider, when the operation lever 3 is pulled toward the rider (rearward), as shown in double-dashed lines, the operation lever 3 and the driving arm 11 rotate together about the support shaft 4, and the throttle cable 6 is in turn pulled. Since this opens a throttle valve (not shown) of a carburetor of an engine, the density of fuel that is supplied to the engine is increased, whereby the engine speed is in turn increased.

Figure 2:
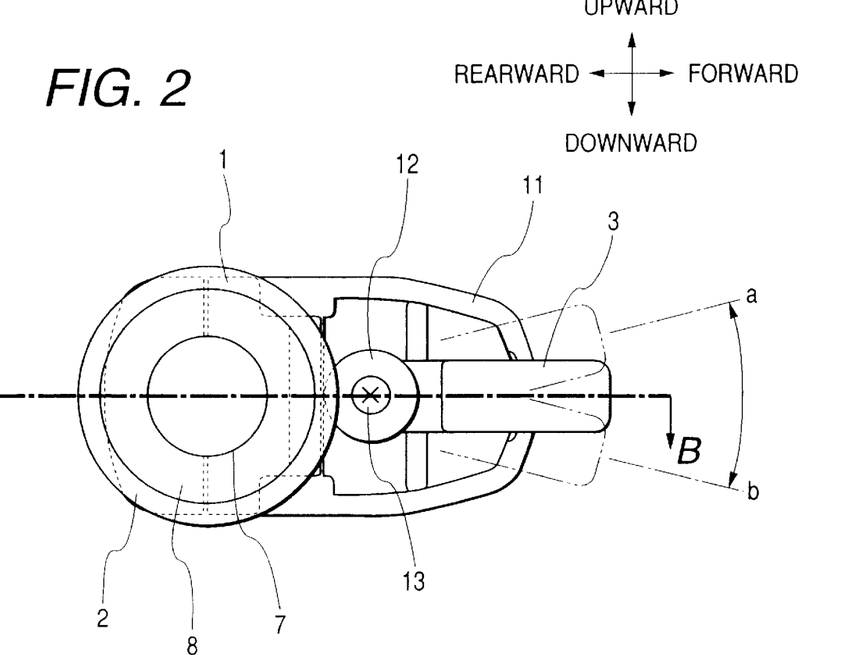
FIG. 2 is a right-hand side view of FIG. 1.
Figure 12:
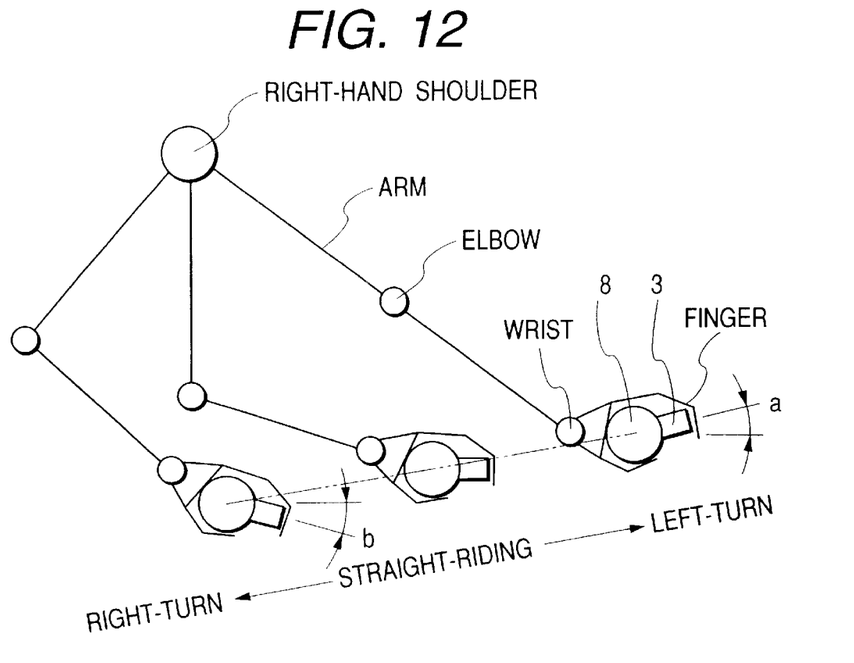
FIG. 12 is a diagram showing a relationship between the operation lever of the throttle lever device of the present invention and the movements of the fingers and arm of a rider.

When the rider turns the handlebar 7 to the left or right in the above state, as shown in FIG. 12, the position of the fingers of the rider changes vertically relative to the operation lever 3. With the throttle lever device according to the present invention, however, since the operation lever 3 is rotatably supported on the shaft 11a of the driving arm 11, as shown in FIGS. 2 and 12, the throttle lever is allowed to rotate vertically within a range from (a) to (b), whereby the throttle lever can follow the movements of the fingers of the rider, good operability being thereby obtained.

In addition, a moderating mechanism is formed such that the moderating ball 15 is brought into engagement with one of the moderating grooves 11d formed in the driving arm by virtue of the elastic force of the spring 14, so that the operation lever 3 can rotate vertically with a certain moderating feeling (five moderating steps being provided in this embodiment).

Second Embodiment

Figure 5:
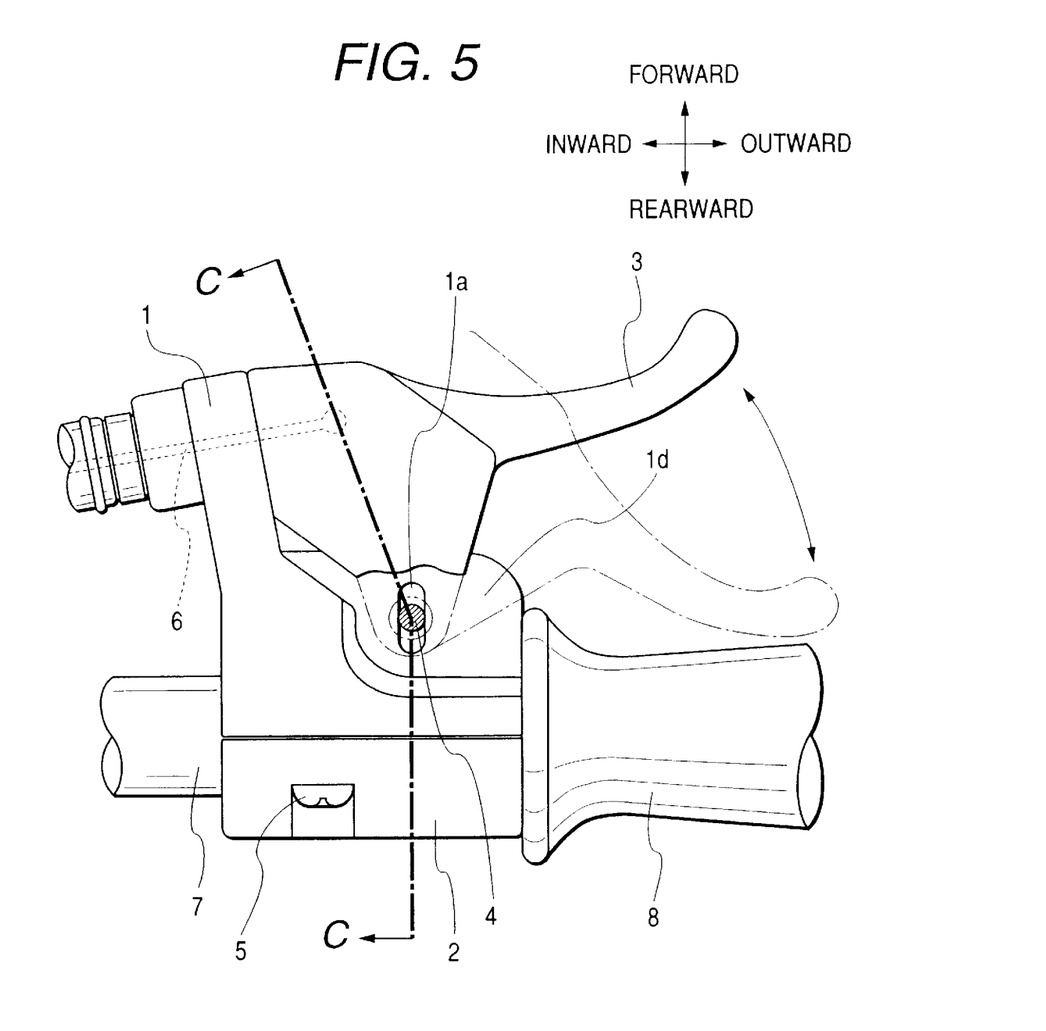
FIG. 5 is a partially cutaway plan view showing a second embodiment of the present invention.
Figure 6:
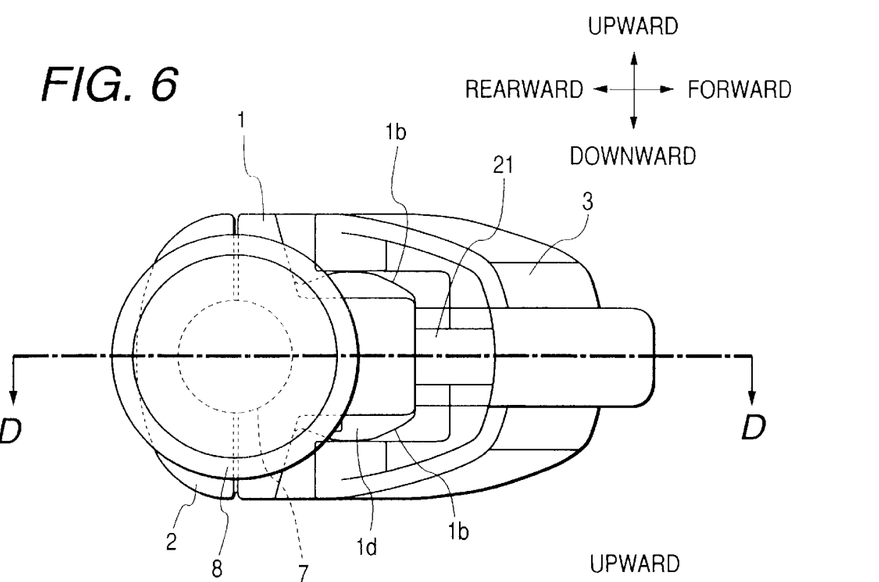
FIG. 6 is a right-hand side view of FIG. 5.

In FIG. 5, reference numeral 1 denotes, as with the first embodiment, a bracket for a throttle lever provided adjacent to a grip 8 provided at an end of a handlebar 7 of a water jet bike or a snowmobile. This bracket 1 is formed of a synthetic resin and is combined with a holder 2 which is assembled to the handlebar 7 from the rear such that the bracket 1 and the holder 2 hold the handlebar 7 therebetween, and they are clamped together with an attachment bolt 5 for fixation together to the handlebar 7.

Figure 8:
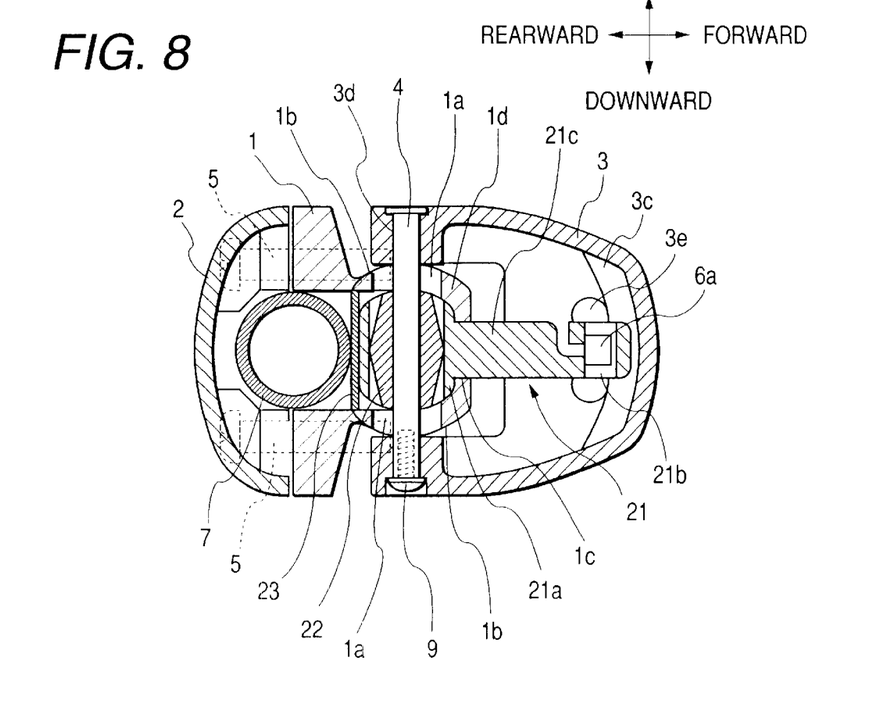
FIG. 8 is a sectional view taken along the line C—C of FIG. 5.
Figure 11:
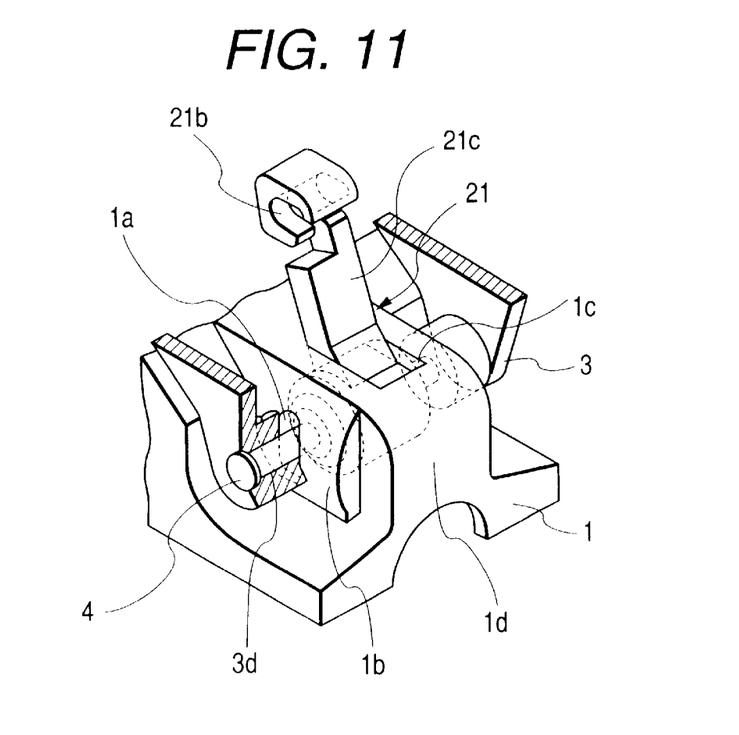
FIG. 11 is a perspective view, partially cutaway, showing a relationship of the cable driving arm, the support shaft, the operation lever and a bracket.

As shown in FIGS. 8 and 11, a hollow support portion 1d is formed at a front portion of the bracket 1, which support portion has upper and lower curved surfaces 1b, and a transversely elongated rectangular hole-like opening 1c is formed in a front portion of the support portion 1d, a longitudinally elongated hole (refer to FIG. 5) being formed in the upper and lower curved surfaces, respectively.

Figure 10:
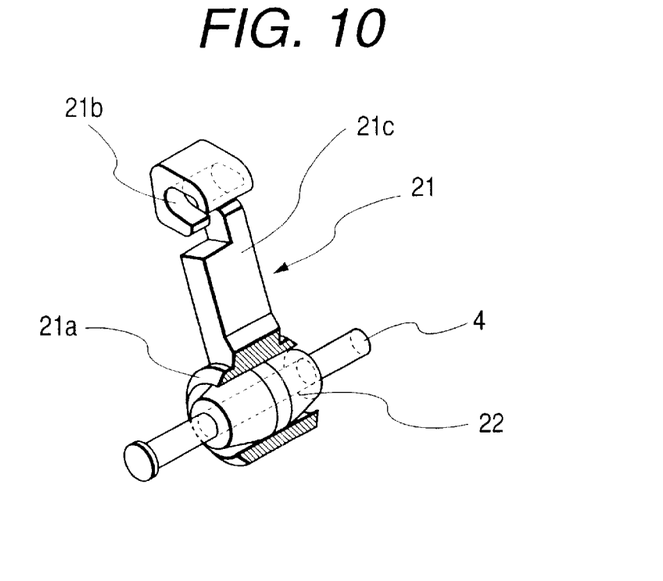
FIG. 10 is a perspective view, partially cutaway, showing a relationship of a cable driving arm, an operator and a support shaft.

As shown in FIGS. 8 and 10, an operator 22 having a barrel-type external surface is disposed in the support portion 1d, and a support shaft 4 is fixed to an axial center of the operator 22, both end portions of the support shaft 4 being allowed to protrude outwardly from the upper and lower elongated holes 1a.

Reference numeral 21 denotes a cable driving arm, and as shown in FIGS. 7 to 10, this cable driving arm comprises a pipe-like base portion 21, an arm portion 21c radially protruding from the pipe-like base portion and an attachment portion 21b provided at a distal end of the arm portion 21c.

The arm portion 21c is allowed to protrude forwardly from the transversely elongated rectangular hole-like opening 1c with the barrel-type operator 22 being inserted in the pipe-like base portion 21a, whereby the pipe-like base portion 21a of the cable driving arm 21 is allowed to rotate around an outer circumferential surface of the operator 22 within the support portion 1d.

Figure 7:
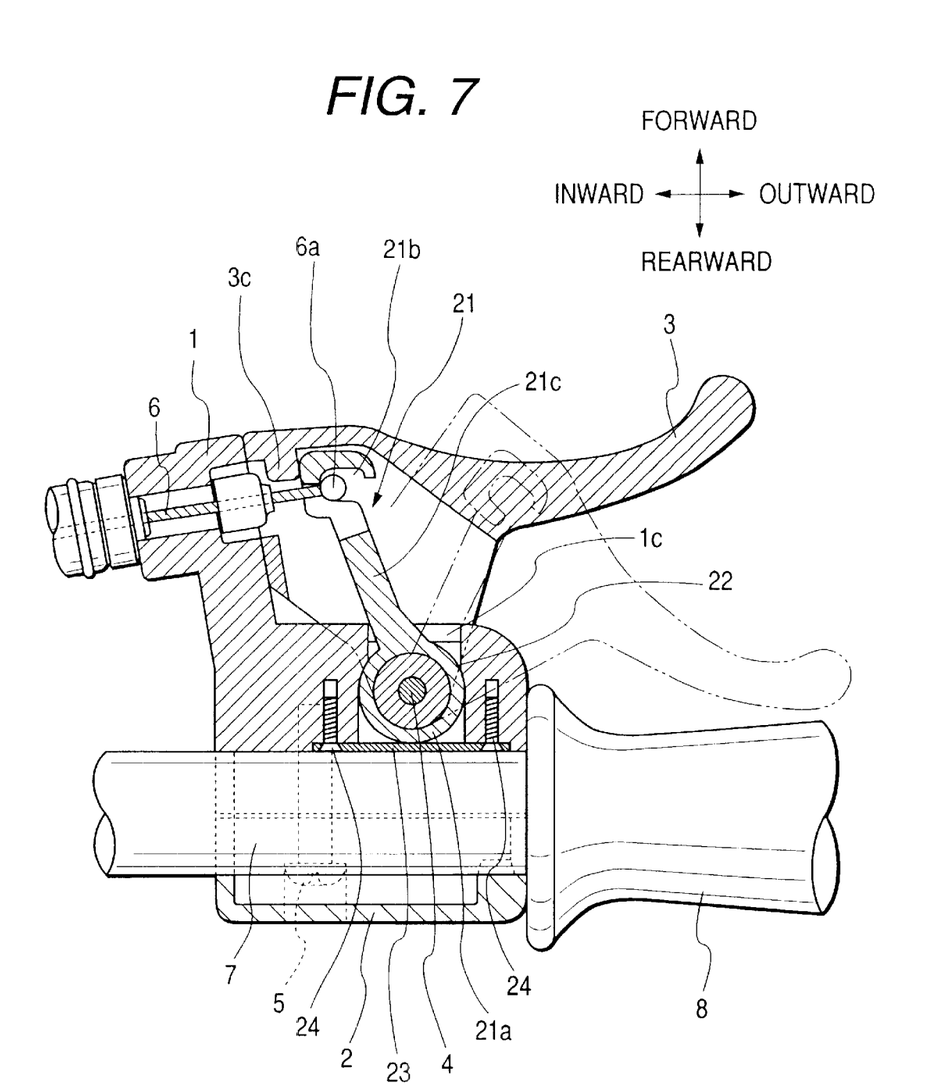
FIG. 7 is a sectional view taken along the line D—D of FIG. 6.

Reference numeral 3 denotes a synthetic resin operation lever that is made open at ends thereof and which has a U-shaped cross-section, and a shaft hole 3d is formed in rear ends of the U-shaped opening. On the other hand, an arc-like projection 3c is provided at a front inner end portion and an arc hole 3e is formed rearward contiguously with the projection 3c. The U-shaped opening is placed so as to cover the cable driving arm 21, and as shown in FIG. 7, and the projection 3c is then brought into abutment with a left side portion of the attachment portion 21b of the cable driving arm 21. In this state, both the curved surfaces 1b of the support portion id are held between inner surfaces of the shaft holes 3d formed in the U-shaped opening.

Furthermore, the support shaft 4 is then inserted into the operator 22 in this state and the ends of the support shaft 4 are inserted into both the shaft holes 3d, whereby the cable driving arm 21 is oscillatably and rotatably supported on the support portion.

In addition, reference numeral 6 denotes, as with the first embodiment, a throttle cable, and this cable is inserted into the bracket from the left side thereof, and a drum member 6a at a tip thereof engages the attachment portion 21b of the driving arm 21 through the arc hole 3e of the operation lever 3.

Furthermore, reference numeral 9 denotes a screw for preventing the support shaft 4 from coming off the bracket and is adapted to be screwed thereinto from below. Reference numeral 23 shown in FIGS. 7 and 8 denotes a plate for closing the opening at a rear end on the inside of the support portion 1d, and the plate is fitted therein from the rear of the support portion 1d of the bracket 1 and is fixed thereto with plate screws 24, 24.

An operation of the throttle lever device according to the second embodiment will be described as below.

The rider places his or her fingers on the operation lever 3 while grasping the grip 8 by his or her hand and pulls it toward him or her (rearward), the operation lever 3 rotates in a horizontal direction about the support shaft 4, and the projection 3c pushes the attachment portion 21b of the cable driving arm 21 outwardly. This allows the cable driving arm 21 to rotate interlockingly with the operation lever 3, and this in turn pulls the throttle cable 6. This then opens a throttle (not shown) valve of a carburetor of an engine, the density of fuel that is supplied to the engine being increased, the engine speed being thereby increased.

Figure 9:
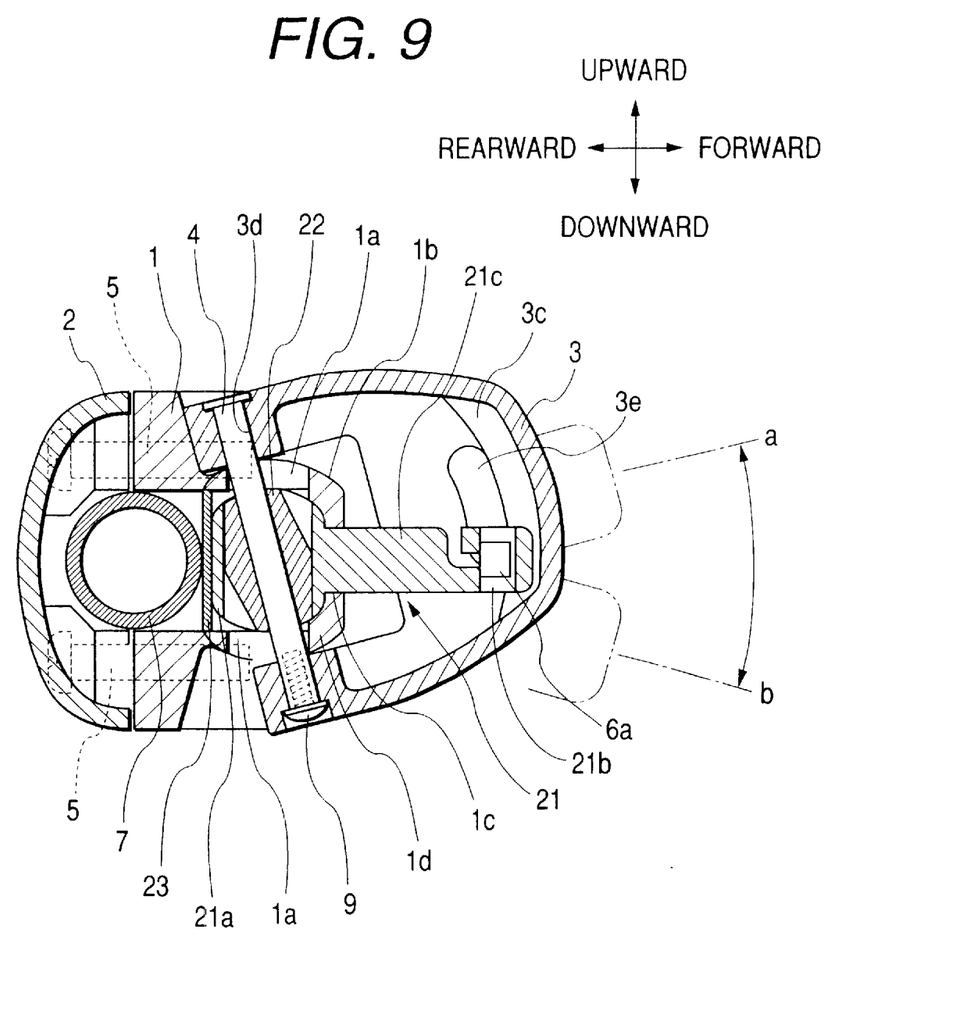
FIG. 9 is a sectional view corresponding to FIG. 8, showing a state in which an operation lever is rotated upwardly.

When the rider rotates the handlebar 7 to the left or right in the above state, the position of the fingers of the rider changes relative to the operation lever 3. When this happens, assuming the barrel-type external surface, the operator 22 is allowed to oscillate back and forth in the pipe-like base portion 21a of the cable driving arm 21, and therefore the support shaft 4 in turn oscillates back and forth along the elongated hole 1a of the support portion together with the operator 22, as shown in FIG. 9.

Then, this allows the operation lever 3 rotatably supported on the support shaft 4 is allowed, as shown in. FIG. 9, to rotate vertically within a range from (a) to (b) along the curved surfaces 1b of the support portion 1d, the operation lever 3 being thereby be allowed, as shown in FIG. 12, to follow the movements of the fingers of the rider based on the same principle as that described in the first embodiment.

When this happens, the cable driving arm 21 is only allowed to rotate in the horizontal direction by the transversely elongated rectangular hole-like opening 1c and is restricted thereby with respect to the vertical movements, and therefore there is no risk of the pull amount of the throttle cable 6 being altered in conjunction with vertical movements of the operation lever 3.

Consequently, since the present invention is constructed as has been described heretofore, even when the rider rotates the handlebar 7 to the left or right, the operation lever 3 can follow the movements of the fingers and automatically oscillate vertically, thereby making it possible to provide a throttle lever device that exhibits good operability and which is markedly easy to use when compared with conventional throttle lever devices.

Note that although in the above-mentioned description the throttle lever devices according to the present invention which is applicable for a water jet bike or a snowmobile is explained, the throttle lever device according to the present invention is also applicable for the another vehicle having a barhandle.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A throttle lever device comprising:
   a throttle lever bracket (1) mounted to a handlebar (7) with a grip (8); and
   a throttle cable operation member (3, 11) for operating a throttle cable (6) through a gripping motion thereof;
   wherein said throttle cable operation member includes an operation lever (3) a tip end of which is movable relative to said throttle lever bracket (1) in vertical and horizontal directions during operation of the throttle lever device,
   wherein said operation lever (3) is moveable relative to said throttle lever bracket about only two rotational axes,
   wherein said throttle cable operation member (3, 11, 21) further includes a driving arm (11, 21) swingably journaled on said throttle lever bracket (1) in the horizontal direction and engaged with an end of said throttle cable (6), wherein said operation lever (3) is swingably journaled on said driving arm (11, 21) in the vertical direction, and
   wherein said driving arm (11, 21) is swingably moved in the horizontal direction so as to operate said throttle cable independently from a swinging movement of said operation lever (3) in the vertical direction.

2. The throttle lever device according to claim 1, wherein said throttle cable operation member (3, 11) further includes a moderating mechanism (3b, 14, 15, 11d) provided between said operation lever (3) and said driving arm (11) for gradually changing vertical positions of said tip end of said operation lever (3).

3. The throttle lever device according to claim 1, wherein said throttle lever bracket (1) comprises a support shaft (4) which extends in the vertical direction and is disposed adjacent to said grip (8), and
   wherein said driving arm (11) comprises:
   a basal portion rotatably supported on said support shaft (4) so as to make said driving arm (11) swingable relative to said throttle lever bracket (1) in the horizontal direction about said support shaft (4);
a tip end engaged with the end of said throttle cable (6); and
a shaft portion (11a) extended in the horizontal direction and disposed between said tip end and said basal portion of said driving arm (11) for rotatably supporting said operation lever (3) so as to make said operation lever swingable in the vertical direction about said shaft portion (11a).

4. The throttle lever device according to claim 3, wherein said driving arm (11) comprises a substantially U-shaped cross-section so that its opening sides constituting said basal portion are rotatably supported on said support shaft (4).

5. The throttle lever device according to claim 4, wherein said throttle cable operation member (3, 11) further includes a moderating mechanism (3b, 14, 15, 11d) provided between said operation lever (3) and said driving arm (11) for gradually changing vertical positions of said tip end of said operation lever (3).

6. The throttle lever device according to claim 1, wherein said throttle lever bracket (1) comprises:
a hollow support portion (1d) disposed at a basal portion of said throttle lever bracket (1), said hollow support portion (1d) including upper and lower curved surfaces (1b, 1b) respectively having upper and lower longitudinally elongated holes (1a, 1a), and a rectangular opening (1c) formed in a front portion of said hollow support portion (1d);
an operating piece (22) having a barrel-shaped external surface and swingably disposed within said hollow support portion (1d); and
a support shaft (4) extending in the vertical direction and disposed adjacent to said grip, said support shaft (4) being fixed to an axially extending center hole of said operating piece while both ends of said support shaft (4) are protruded outwardly from said upper and lower elongated holes (1a, 1a),
wherein said driving arm (21) comprises:
an arm portion (21c) protruded through said rectangular opening (1c);
a distal portion (21b) connected with said arm portion (21c) and engaged with the end of said throttle cable (6); and
a pipe-shaped basal portion (21a) rotatably supported in the horizontal direction within said hollow support portion (1d) for guiding a swinging motion of said operating piece (22) in the vertical direction, and
wherein said operation lever (3) comprises:
a projection (3c) provided at the tip end thereof for engaging with said distal portion (21b) of said driving arm (21).

7. The throttle lever device according to claim 6, wherein said operation lever (3) comprises:
an arc-shaped hole (3e) brought in engagement with a drum member (6a) which is provided at an end of said throttle cable (6) so as to restrict a swinging region of said operation lever (3) relative to said throttle lever bracket (1) in the vertical direction.

8. A throttle lever device comprising:
a throttle lever bracket (1) mounted to a handlebar (7) with a grip (8); and
a throttle cable operation member (3, 11) for operating a throttle cable (6) through a gripping motion thereof, wherein said throttle cable operation member includes an operation lever (3) a tip end of which is movable relative to said throttle lever bracket (1) in vertical and horizontal directions,
wherein said throttle cable operation member (3, 11, 21) further includes a driving arm (11, 21) swingably journaled on said throttle lever bracket (1) in the horizontal direction and engaged with an end of said throttle cable (6), wherein said operation lever (3) is swingably journaled on said driving arm (11, 21) in the vertical direction,
wherein said throttle lever bracket (1) includes
a) a hollow support portion (1d) disposed at a basal portion of said throttle lever bracket (1), said hollow support portion (1d) including upper and lower curved surfaces (1b, 1b) respectively having upper and lower longitudinally elongated holes (1a, 1a), and a rectangular opening (1c) formed in a front portion of said hollow support portion (1d);
b) an operating piece (22) having a barrel-shaped external surface and swingably disposed within said hollow support portion (1d); and
c) a support shaft (4) extending in the vertical direction and disposed adjacent to said grip, said support shaft (4) being fixed to an axially extending center hole of said operating piece while both ends of said support shaft (4) are protruded outwardly from said upper and lower elongated holes (1a, 1a),
wherein said driving arm (21) includes
a) an arm portion (21c) protruded through said rectangular opening (1c);
b) a distal portion (21b) connected with said arm portion (21c) and engaged with the end of said throttle cable (6); and
c) a pipe-shaped basal portion (21a) rotatably supported in the horizontal direction within said hollow support portion (1d) for guiding a swinging motion of said operating piece (22) in the vertical direction, and
wherein said operation lever (3) includes a projection (3c) provided at the tip end thereof for engaging with said distal portion (21b) of said driving arm (21).

9. The throttle lever device according to claim 8, wherein said operation lever (3) comprises:
an arc-shaped hole (3e) brought in engagement with a drum member (6a) which is provided at an end of said throttle cable (6) so as to restrict a swinging region of said operation lever (3) relative to said throttle lever bracket (1) in the vertical direction.

* * * * *